(12) United States Patent
Ding (10) Patent No.: US 11,916,629 B2
(45) Date of Patent: Feb. 27, 2024

(54) ANTENNA SWITCHING METHOD FOR TERMINAL DEVICE AND APPARATUS

(71) Applicant: Huawei Technologies Co., Ltd., Shenzhen (CN)

(72) Inventor: Rentian Ding, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 17/441,333

(22) PCT Filed: Mar. 27, 2020

(86) PCT No.: PCT/CN2020/081695
§ 371 (c)(1),
(2) Date: Sep. 21, 2021

(87) PCT Pub. No.: WO2020/200097
PCT Pub. Date: Oct. 8, 2020

(65) Prior Publication Data
US 2022/0173778 A1 Jun. 2, 2022

(30) Foreign Application Priority Data
Mar. 29, 2019 (CN) .......................... 201910252464.4

(51) Int. Cl.
*H04B 1/02* (2006.01)
*H04B 7/06* (2006.01)
*H04B 17/382* (2015.01)

(52) U.S. Cl.
CPC ......... *H04B 7/0608* (2013.01); *H04B 17/382* (2015.01)

(58) Field of Classification Search
CPC .... H04B 7/0608; H04B 17/382; H04B 17/12; H04B 7/0404; H04B 7/0602
See application file for complete search history.

(56) References Cited

U.S. PATENT DOCUMENTS

2008/0132265 A1\* 6/2008 Tudosoiu ............. H04B 7/0877
455/522
2014/0233665 A1 8/2014 Clevorn et al.
(Continued)

FOREIGN PATENT DOCUMENTS

CN 101072066 A 11/2007
CN 101202577 A 6/2008
(Continued)

OTHER PUBLICATIONS

"Draft Amendment to Standard [for] Information Technology—Telecommunications and information exchange between systems—Local and Metropolitan networks—Specific requirements—Part 11: Wireless LAN Medium Access Control (MAC) and Physical Layer (PHY) specifications: Enhancements for Higher Throughput," IEEE P802.11n/D1.0, Total 335 pages, Institute of Electrical and Electronics Engineers, New York, New York (Mar. 2006).

*Primary Examiner* — Nhan T Le
(74) *Attorney, Agent, or Firm* — Leydig, Voit & Mayer, Ltd.

(57) ABSTRACT

Embodiments of this application provide an antenna switching method for a terminal device and an apparatus. The terminal device sends detection packets through at least two antennas within uplink estimated time, obtains, based on response messages corresponding to the detection packets, spectrum effectiveness that is of the at least two antennas and that is within the uplink estimated time, and switches a current transmit antenna of the terminal device based on the spectrum effectiveness of the at least two antennas. In this manner, the terminal device determines, based on the uplink spectrum effectiveness of the at least two antennas, whether to switch the current transmit antenna. Because the uplink spectrum effectiveness of the antennas can accurately reflect a real environment of uplink transmission, antenna switch- (Continued)

ing can be accurately performed. This improves performance of an uplink transmit antenna.

19 Claims, 6 Drawing Sheets

(56) References Cited

U.S. PATENT DOCUMENTS

2019/0068260 A1* 2/2019 Yan .................. H04B 7/0404
2019/0297019 A1* 9/2019 Mudireddy ............ H04L 69/04

FOREIGN PATENT DOCUMENTS

| | | | |
|---|---|---|---|
| CN | 101383646 | A | 3/2009 |
| CN | 101640949 | A | 2/2010 |
| CN | 101964698 | A | 2/2011 |
| CN | 102217343 | A | 10/2011 |
| CN | 102422556 | A | 4/2012 |
| CN | 102932926 | A | 2/2013 |
| CN | 104639225 | A | 5/2015 |
| CN | 104980205 | A | 10/2015 |
| CN | 108174407 | A | 6/2018 |
| CN | 108494457 | A | 9/2018 |
| CN | 108834155 | A | 11/2018 |
| CN | 110098857 | A | 8/2019 |
| EP | 2608316 | A1 | 6/2013 |
| WO | 2018039527 | A1 | 3/2018 |
| WO | 2018203711 | A1 | 11/2018 |

* cited by examiner

ANTENNA SWITCHING METHOD FOR TERMINAL DEVICE AND APPARATUS

CROSS-REFERENCE TO RELATED APPLICATIONS

This application is a national stage of International Application No. PCT/CN2020/081695, filed on Mar. 27, 2020, which claims priority to Chinese Patent Application No. 201910252464.4, filed on Mar. 29, 2019. Both of the aforementioned applications are hereby incorporated by reference in their entireties.

TECHNICAL FIELD

Embodiments of this application relate to the communications field, and in particular to an antenna switching method for a terminal device and an apparatus.

BACKGROUND

Antennas of a terminal device include a main antenna and a diversity antenna. The main antenna is configured to transmit and receive a signal, and the diversity antenna is configured to receive a signal. The main antenna is usually disposed at the bottom of the terminal device, and the diversity antenna is usually disposed at the top of the terminal device. When a user holds the terminal device to make a call, the main antenna at the bottom is easily blocked. As a result, performance of the main antenna deteriorates sharply and uplink transmission fails, leading to voice interruption.

To resolve the foregoing problem, a transmit antenna switch (Transmitting antenna selection, TAS for short) technology is introduced in the conventional technology. A modem collects downlink received energy of the main antenna and the diversity antenna within preset time, performs smooth filtering on the downlink received energy of the main antenna and the diversity antenna, and determines whether to perform antenna switching based on the downlink received energy of the main antenna and the diversity antenna.

However, because an uplink frequency band and a downlink frequency band are different, the downlink received energy of the main antenna and the diversity antenna cannot accurately reflect a situation of an uplink transmit antenna, and transmit antenna switching performed based on the downlink received energy of the main antenna and the diversity antenna may reduce performance of the transmit antenna.

SUMMARY

Embodiments of this application provide an antenna switching method for a terminal device and an apparatus, to accurately perform antenna switching, and improve performance of an uplink transmit antenna.

According to a first aspect of this application, an antenna switching method for a terminal device is provided, and includes:
  sending detection packets within uplink estimated time through at least two antennas of the terminal device;
  obtaining, based on response messages corresponding to the detection packets, spectrum effectiveness that is of the at least two antennas and that is within the uplink estimated time; and
  switching a current transmit antenna of the terminal device based on the spectrum effectiveness of the at least two antennas.

Optionally, the switching a current transmit antenna of the terminal device based on the spectrum effectiveness of the at least two antennas includes:
  calculating a first difference between spectrum effectiveness of the current transmit antenna and spectrum effectiveness of an antenna with highest spectrum effectiveness in the at least two antennas; and
  when an absolute value of the first difference is greater than or equal to a preset spectrum effectiveness threshold, switching the current transmit antenna to the antenna with the highest spectrum effectiveness.

Optionally, the switching a current transmit antenna of the terminal device based on the spectrum effectiveness of the at least two antennas includes:
  determining an antenna with highest spectrum effectiveness from the at least two antennas; and
  when the antenna with the highest spectrum effectiveness is different from the current transmit antenna, switching the current transmit antenna to the antenna with the highest spectrum effectiveness.

Optionally, the switching a current transmit antenna of the terminal device based on the spectrum effectiveness of the at least two antennas includes:
  calculating a first difference between spectrum effectiveness of an antenna with highest spectrum effectiveness in the at least two antennas and spectrum effectiveness of an antenna with lowest spectrum effectiveness in the at least two antennas; and
  when an absolute value of the first difference is greater than or equal to a preset spectrum effectiveness threshold, and the antenna with the highest spectrum effectiveness is different from the current transmit antenna, switching the current transmit antenna to the antenna with the highest spectrum effectiveness.

Optionally, the switching a current transmit antenna of the terminal device based on the spectrum effectiveness of the at least two antennas includes:
  calculating a first difference between spectrum effectiveness of any two of the at least two antennas; and
  when an absolute value of the first difference between the spectrum effectiveness of any two antennas is greater than or equal to a preset spectrum effectiveness threshold, and an antenna with highest spectrum effectiveness in the at least two antennas is different from the current transmit antenna, switching the current transmit antenna to the antenna with the highest spectrum effectiveness.

Optionally, before the switching a current transmit antenna based on the spectrum effectiveness of the at least two antennas, the method further includes:
  detecting downlink received energy that is of the at least two antennas and that is within downlink estimated time;
  determining whether an absolute value of a second difference is greater than or equal to a preset energy threshold, where the second difference is a difference between downlink received energy of an antenna with highest downlink received energy in the at least two antennas and downlink received energy of an antenna with lowest downlink received energy in the at least two antennas.

The switching a current transmit antenna based on the spectrum effectiveness of the at least two antennas includes:

when the absolute value of the second difference is greater than or equal to the preset energy threshold, switching the current transmit antenna based on the spectrum effectiveness of the at least two antennas.

Optionally, before the switching a current transmit antenna based on the spectrum effectiveness of the at least two antennas, the method further includes:

detecting downlink received energy that is of the at least two antennas and that is within downlink estimated time;

determining whether an absolute value of a second difference is greater than or equal to a preset energy threshold, where the second difference is a difference between downlink received energy of an antenna with highest downlink received energy in the at least two antennas and downlink received energy of an antenna with lowest downlink received energy in the at least two antennas.

The switching a current transmit antenna based on the spectrum effectiveness of the at least two antennas includes:

when the absolute value of the second difference is greater than or equal to the preset energy threshold, determining whether spectrum effectiveness of the current transmit antenna is less than a preset switching threshold; and when the spectrum effectiveness of the current transmit antenna is less than the switching threshold, switching the current transmit antenna to an antenna with highest spectrum effectiveness in the at least two antennas.

Optionally, the detection packets are empty packets, and the empty packets do not carry user data. Before the sending detection packets within the uplink estimated time through at least two antennas of the terminal device, the method further includes:

receiving an uplink grant message sent by a base station, where the uplink grant message is sent by the base station according to pre-scheduling time.

The sending detection packets within the uplink estimated time through at least two antennas of the terminal device includes:

sending the detection packets based on the uplink grant message within the uplink estimated time through the at least two antennas in turn.

Optionally, the detection packets are empty packets, and the empty packets do not carry user data. Before the sending detection packets within the uplink estimated time through at least two antennas of the terminal device, the method further includes:

sending a scheduling request SR to a base station; and receiving an uplink grant message sent by the base station.

The sending detection packets within the uplink estimated time through at least two antennas of the terminal device includes:

sending the detection packets based on the uplink grant message within the uplink estimated time through the at least two antennas in turn.

Optionally, the at least two antennas include a main antenna and a diversity antenna. The main antenna is disposed at the bottom of the terminal device, and the diversity antenna is disposed at the top of the terminal device.

According to a second aspect of this application, a terminal device is provided, and includes:

a sending module, configured to send detection packets within uplink estimated time through at least two antennas of the terminal device;

an obtaining module, configured to obtain, based on response messages corresponding to the detection packets, spectrum effectiveness that is of the at least two antennas and that is within the uplink estimated time; and a switching module, configured to switch a current transmit antenna of the terminal device based on the spectrum effectiveness of the at least two antennas.

Optionally, the switching module is specifically configured to:

calculate a first difference between spectrum effectiveness of the current transmit antenna and spectrum effectiveness of an antenna with highest spectrum effectiveness in the at least two antennas; and when an absolute value of the first difference is greater than or equal to a preset spectrum effectiveness threshold, switch the current transmit antenna to the antenna with the highest spectrum effectiveness.

Optionally, the switching module is specifically configured to:

determine an antenna with highest spectrum effectiveness from the at least two antennas; and when the antenna with the highest spectrum effectiveness is different from the current transmit antenna, switch the current transmit antenna to the antenna with the highest spectrum effectiveness.

Optionally, the switching module is specifically configured to:

calculate a first difference between spectrum effectiveness of an antenna with highest spectrum effectiveness in the at least two antennas and spectrum effectiveness of an antenna with lowest spectrum effectiveness in the at least two antennas; and when an absolute value of the first difference is greater than or equal to a preset spectrum effectiveness threshold, and the antenna with the highest spectrum effectiveness is different from the current transmit antenna, switch the current transmit antenna to the antenna with the highest spectrum effectiveness.

Optionally, the switching module is specifically configured to:

calculate a first difference between spectrum effectiveness of any two of the at least two antennas; and when an absolute value of the first difference between the spectrum effectiveness of any two antennas is greater than or equal to a preset spectrum effectiveness threshold, and an antenna with highest spectrum effectiveness in the at least two antennas is different from the current transmit antenna, switch the current transmit antenna to the antenna with the highest spectrum effectiveness.

Optionally, the terminal device further includes:

a detection module, configured to detect downlink received energy that is of the at least two antennas and that is within downlink estimated time; and a determining module, configured to determine whether an absolute value of a second difference is greater than or equal to a preset energy threshold, where the second difference is a difference between downlink received energy of an antenna with highest downlink received energy in the at least two antennas and downlink received energy of an antenna with lowest downlink received energy in the at least two antennas.

The switching module is specifically configured to:

when the absolute value of the second difference is greater than or equal to the preset energy threshold, switch the current transmit antenna based on the spectrum effectiveness of the at least two antennas.

Optionally, the terminal device further includes:

a detection module, configured to detect downlink received energy that is of the at least two antennas and that is within downlink estimated time; and a determining module, configured to determine whether an absolute value of a second difference is greater than or equal to a preset energy threshold, where the second difference is a difference between downlink received energy of an antenna with highest downlink received energy in the at least two antennas and downlink received energy of an antenna with lowest downlink received energy in the at least two antennas.

The switching module is specifically configured to:

when the absolute value of the second difference is greater than or equal to the preset energy threshold, determine whether spectrum effectiveness of the current transmit antenna is less than a preset switching threshold; and when the spectrum effectiveness of the current transmit antenna is less than the switching threshold, switch the current transmit antenna to an antenna with highest spectrum effectiveness in the at least two antennas.

Optionally, the detection packets are empty packets, and the empty packets do not carry user data. The terminal device further includes:

a receiving module, configured to receive an uplink grant message sent by a base station, where the uplink grant message is sent by the base station according to pre-scheduling time.

The sending module is specifically configured to:

send the detection packets based on the uplink grant message within the uplink estimated time through the at least two antennas in turn.

Optionally, the detection packets are empty packets, and the empty packets do not carry user data. The terminal device further includes a receiving module.

The sending module is further configured to send a scheduling request SR to a base station.

The receiving module is configured to receive an uplink grant message sent by the base station.

The switching module is specifically configured to:

send the detection packets based on the uplink grant message within the uplink estimated time through the at least two antennas in turn.

Optionally, the at least two antennas include a main antenna and a diversity antenna. The main antenna is disposed at the bottom of the terminal device, and the diversity antenna is disposed at the top of the terminal device.

According to a third aspect of this application, a terminal device is provided, and includes at least two antennas, a processor, and a memory. The memory is configured to store instructions, the at least two antennas are configured to communicate with another device, and the processor is configured to execute the instructions stored in the memory, so that the terminal device performs the method according to any one of the first aspect and the optional manners of this application.

According to a fourth aspect of this application, a computer-readable storage medium is provided. The computer-readable storage medium stores instructions, and when the instructions are executed, a computer is enabled to perform the method according to any one of the first aspect and the optional manners of this application.

According to a fifth aspect of this application, a computer program product is provided. The computer program product includes instructions, and when the instructions are executed, a computer is enabled to perform the method according to any one of the first aspect and the optional manners.

According to a sixth aspect of this application, a system-on-a-chip or a system chip is provided. The system-on-a-chip or the system chip may be applied to a terminal device, and includes at least one communications interface, at least one processor, and at least one memory. The communications interface, the memory, and the processor are interconnected through a bus. The processor executes instructions stored in the memory, so that the terminal device is enabled to perform the method according to any one of the first aspect and the optional manners.

According to the antenna switching method for the terminal device and the apparatus provided in the embodiments of this application, the terminal device sends detection packets within uplink estimated time through at least two antennas, obtains, based on response messages corresponding to the detection packets, spectrum effectiveness that is of the at least two antennas and that is within the uplink estimated time, and switches a current transmit antenna of the terminal device based on the spectrum effectiveness of the at least two antennas. In this manner, the terminal device determines, based on the uplink spectrum effectiveness of the at least two antennas, whether to switch the current transmit antenna. Because the uplink spectrum effectiveness of the antennas can accurately reflect a real environment of uplink transmission, antenna switching can be accurately performed. This improves performance of an uplink transmit antenna.

DESCRIPTION OF EMBODIMENTS

Figure 1:
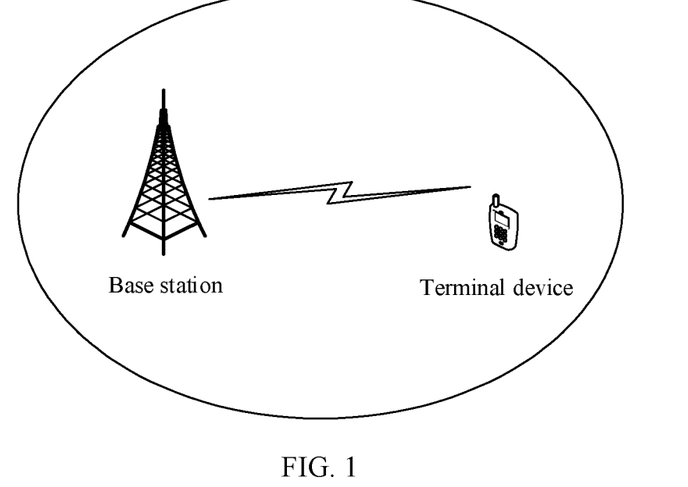
FIG. 1 is a schematic diagram of a network architecture to which an embodiment of this application is applicable.

This application provides an antenna switching method for a terminal device. FIG. 1 is a schematic diagram of a network architecture to which an embodiment of this application is applicable. As shown in FIG. 1, the network architecture includes a base station and at least one terminal device. It should be noted that the base station described in this application may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB) in a long term evolution (LTE) system, an access point (AP), or a relay station, or may be a base station (such as a gNB or a transmission point (TRP)) in a fifth generation mobile communications (5G) system, or may be a wireless controller, a wearable device, a vehicle-mounted device, or the like in a cloud radio access network (CRAN) scenario. This is not limited herein. The 5G system is also referred to as a new radio communications system, new radio, or a next-generation mobile communications system.

The terminal device described in this application may be user equipment (UE), an access terminal, a UE unit, a UE station, a mobile station, a remote station, a remote terminal, a mobile device, a UE terminal, a terminal, a wireless terminal device, a UE agent, a UE apparatus, or the like. The terminal device may also be a cellular telephone, a cordless telephone, a session initiation protocol (SIP) telephone, a wireless local loop (WLL) station, a personal digital assistant (PDA), a handheld device having a wireless communication function, a computing device, or other processing device connected to a wireless modem, a vehicle-mounted device, a wearable device (such as a smart watch, a smart band, and a pedometer), a terminal in a future 5G network, a terminal in a future evolved public land mobile network (PLMN), or the like.

In embodiments of this application, at least two antennas are disposed inside the terminal device. Each antenna can be used for transmitting and receiving a signal, or some antennas can be used for transmitting and receiving signals, and some antennas can be used only for receiving signals. This is not limited in this embodiment. In addition, a position of an antenna is not limited in this embodiment.

Figure 2:
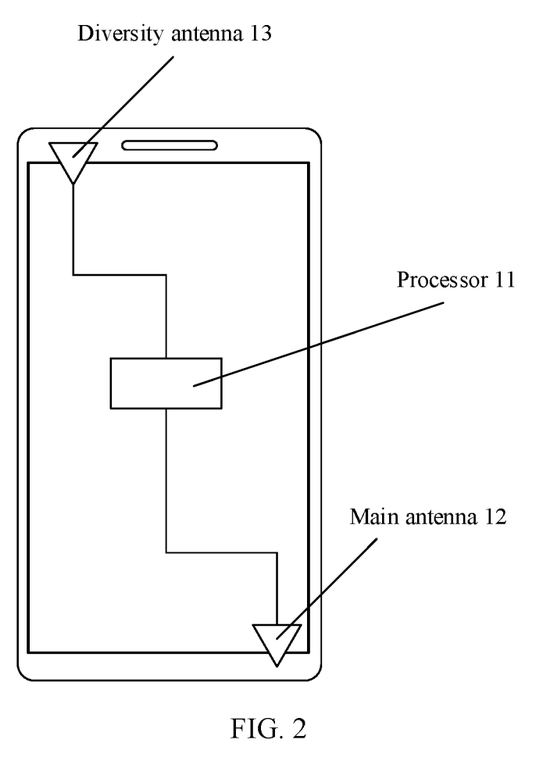
FIG. 2 is a schematic structural diagram of a terminal device to which an embodiment of this application is applicable.

FIG. 2 is a schematic structural diagram of a terminal device to which an embodiment of this application is applicable. As shown in FIG. 2, the terminal device includes a processor 11, a main antenna 12, and a diversity antenna 13, and the main antenna 12 and the diversity antenna 13 are connected to the processor 11 through a bus.

The processor 11 may include one or more processing units. For example, the processor 11 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

In some embodiments, the terminal device may alternatively include one or more processors 11. The processor 11 is a nerve center and a command center of the terminal device. The processor 11 may generate an operation control signal based on an instruction operation code and a time sequence signal to complete control of instruction fetching and instruction execution. A memory may be further disposed in the processor 11, and is configured to store instructions and data. In some embodiments, the memory in the processor 11 is a cache memory. The memory may store instructions or data just used or cyclically used by the processor 11. If the processor 11 needs to use the instructions or the data again, the processor 11 may directly invoke the instructions or the data from the memory. This avoids repeated access and reduces waiting time of the processor 11. Therefore, efficiency of the terminal device is improved.

The main antenna 12 is configured to transmit and receive a signal, the diversity antenna 13 is configured to receive a signal, and both the main antenna 12 and the diversity antenna 13 may cover one or more communications frequency bands.

In the terminal device shown in FIG. 2, the main antenna 12 is disposed at the lower right corner of the terminal device, and the diversity antenna 13 is disposed at the upper left corner of the terminal device. Certainly, positions of the main antenna 12 and the diversity antenna 13 are not limited to the positions shown in FIG. 2, and the main antenna 12 and the diversity antenna 13 may be further disposed at any position of the terminal device. For example, the main antenna 12 may be disposed at any position at the bottom of the terminal device, and the diversity antenna 13 may be disposed at any position at the top of the terminal device. Alternatively, the main antenna 12 is disposed on the left side near the middle of the terminal device, and the diversity antenna 13 is disposed at any position at the top of the terminal device. The positions of the main antenna 12 and the diversity antenna 13 are not limited in this embodiment.

In addition, in the embodiments of this application, quantities of main antennas and diversity antennas included in the terminal device are not limited, and the terminal device may further include more main antennas and diversity antennas. For example, the terminal device includes two main antennas and one diversity antenna. The main antennas can be switched.

It may be understood that FIG. 2 is merely a schematic diagram of the terminal device, and the terminal device may further include more elements.

In the conventional technology, a terminal device determines whether to switch a transmit antenna based on downlink received energy of a main antenna and a diversity antenna, and this deteriorates antenna performance. An uplink channel is different from a downlink channel. For example, an uplink frequency is different from a downlink frequency in a frequency division duplexing (FDD) system. Therefore, transmit antenna switching that is determined based on downlink received energy of an antenna may be inaccurate.

In addition, a supplementary uplink (SUL) frequency band is introduced into a frequency band in a 5G system. The SUL frequency band usually uses a 1.8 GHz frequency band, and a downlink frequency band of the 5G system uses a 3.5 GHz frequency band. A difference between the uplink frequency band and the downlink frequency band is greater. Therefore, the downlink received energy of the antenna cannot reflect an uplink transmission situation of the antenna.

Moreover, uplink transmission of the antenna further needs to meet a radiation index of a specific absorption rate (SAR). The SAR means an electromagnetic wave absorption ratio or the specific absorption rate, is an electromagnetic wave energy absorption ratio of a mobile phone or a wireless product, and is defined as: an induced electromagnetic field produced by a human body under an action of an external electromagnetic field. SAR reductions of antennas are different. Therefore, the downlink received energy of the antenna cannot reflect an SAR power that needs to be reduced for the uplink transmission. If the transmit antenna is switched based on the downlink received energy of the main antenna and the diversity antenna, the antenna performance deteriorates.

Figure 3:
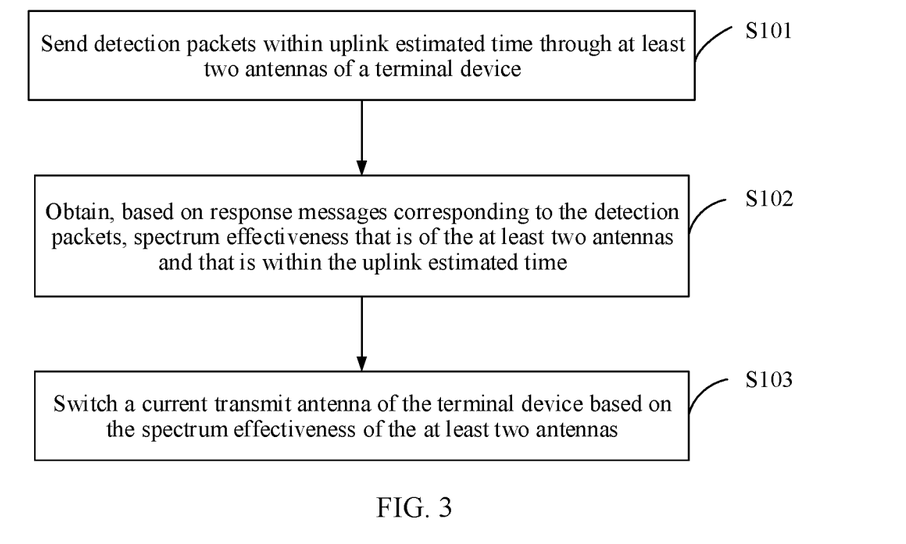
FIG. 3 is a flowchart of an antenna switching method for a terminal device according to Embodiment 1 of this application.

To resolve the problem in the conventional technology, Embodiment 1 of this application provides an antenna switching method for a terminal device. FIG. 3 is a flowchart of the antenna switching method for the terminal device according to Embodiment 1 of this application. As shown in FIG. 3, the method provided in this embodiment includes the following steps.

S101: Send detection packets within uplink estimated time through at least two antennas of the terminal device.

The uplink estimated time may be configured by a network side device for the terminal device, for example, configured by a base station for the terminal device by using a configuration message, or may be preset in the terminal device before delivery of the terminal device.

The uplink estimated time may be periodic time, and duration and an interval of the uplink estimated time may be configured by the base station. For example, the duration of the uplink estimated time is 5 seconds, 10 seconds, 15 seconds, or 30 seconds, and the interval is 1 minute.

The at least two antennas may be all antennas of the terminal device, or may be some antennas of the terminal device. For example, the terminal device has four antennas, and the terminal device may measure all the four antennas, or may measure only two or three of the antennas.

For example, the terminal device may send the detection packets within the uplink estimated time through the at least two antennas in turn. For example, the terminal device sends detection packets through three antennas in turn. Within the uplink estimated time, the terminal device sends a detection packet through an antenna 1 for the first time, sends a detection packet through an antenna 2 for the second time, sends a detection packet through an antenna 3 for the third time, sends a detection packet through the antenna 1 for the fourth time, sends a detection packet through the antenna 2 for the fifth time, and sends a detection packet through the antenna 3 for the sixth time. In other words, the terminal device sends the detection packets through the antenna 1, the antenna 2, and the antenna 3 in turn.

Certainly, the terminal device may send a detection packet through the antenna 1 in the first ⅓ of the uplink estimated time, send a detection packet through the antenna 2 in the middle ⅓ of the uplink estimated time, and send a detection packet through the antenna 3 in the last ⅓ of the uplink estimated time. Alternatively, within the uplink estimated time, the terminal device first sends two detection packets through the antenna 1, sends two detection packets through the antenna 2, and then sends two detection packets through the antenna 3. The terminal device alternately sends the detection packets in this manner. The foregoing description is merely an example. This embodiment constitutes no limitation to a manner of sending the detection packets provided that the detection packets are sent within the uplink estimated time through all the three antennas.

The detection packets may be data packets or empty packets. The data packet is a packet carrying user data, and the empty packet does not carry user data. At a radio link control (Radio Link Control, RLC) layer, the empty packet is an all-0 packet, and is also referred to as a padding (padding) packet.

Pre-scheduling is introduced in LTE and NR. The pre-scheduling is actively triggered by a base station, and the base station actively sends an uplink grant message (UL grant) to the terminal device. After the terminal device receives the uplink grant message, if the terminal device currently needs to send uplink data, the terminal device sends data packets based on a granted uplink resource. If the terminal device currently does not need to send uplink data, the terminal device sends empty packets based on the granted uplink resource.

The pre-scheduling includes normal pre-scheduling and smart pre-scheduling. For the normal pre-scheduling, after the terminal device enters a connected mode, the base station continuously sends grant messages to the terminal device at a preset cycle (for example, 5 ms (millisecond)). For the smart pre-scheduling, after downlink scheduling exists, the base station starts a pre-scheduling window (for example, 50 ms), and sends a grant message to the terminal device in the pre-scheduling window. It may be understood that the preset cycle or the pre-scheduling window may be configured as required.

In this embodiment, uplink detection may be performed by pre-scheduling the sent empty packets. Correspondingly, the terminal device receives the uplink grant message sent by the base station, where the uplink grant message is sent by the base station according to pre-scheduling time. The terminal device sends the empty packets based on the uplink grant message within the uplink estimated time through the at least two antennas in turn.

Optionally, when the base station does not trigger the pre-scheduling, if the terminal device still needs to measure spectrum effectiveness of the antenna, the terminal device may actively send a scheduling request (SR) to the base station, and the base station sends the uplink grant message to the terminal device based on the SR. The terminal device receives the uplink grant message sent by the base station, and sends the empty packets based on the uplink grant message within the uplink estimated time through the at least two antennas in turn. This manner does not depend on the pre-scheduling of the base station. Instead, the terminal device actively initiates measuring the spectrum effectiveness of the antenna by using the empty packets.

S102: Obtain, based on response messages corresponding to the detection packets, spectrum effectiveness that is of the at least two antennas and that is within the uplink estimated time.

After receiving the data packets or the empty packets sent by the terminal device, the base station returns the corresponding response message, where the response message is an acknowledgment (acknowledge, ACK) or a negative acknowledgment (non-acknowledge, NACK).

Spectrum effectiveness may be defined as a symbol transmission rate in a unit frequency band, that is, the spectrum effectiveness=R/B, where R is a symbol rate, B represents a bandwidth, and a unit is Bd/Hz (baud per Hz). A transmission bandwidth B of a digital signal depends on the symbol rate R, and the symbol rate has a definite relationship with information rate Rb. To compare transmission rates of different systems, the spectrum effectiveness can be defined as the spectrum effectiveness=Rb/B, where Rb represents the information rate, and a unit is bps/Hz (bit per second per Hz).

In this embodiment, each time the terminal device sends a detection packet, the base station returns an ACK or a NACK. If the terminal device receives the NACK, it indicates that a bit error occurs on a physical uplink shared channel (physical uplink shared channel, PUSCH), and spectrum effectiveness corresponding to the detection packet is 0. If the terminal device receives the ACK, the terminal device determines that the spectrum effectiveness corresponding to the detection packet is spectrum effectiveness corresponding to a modulation code scheme (MCS) that is used to send the data packet.

An IEE802.11n radio frequency rate is configured by using MCS indexes. A modulation code table of the MCS is a representation form proposed by 802.11n to represent a communications rate of WLAN. The MCS uses concerned factors that affect the communications rate as columns of the table, and uses the MCS indexes (index) as rows of the table to form a rate table. Therefore, each MCS index actually corresponds to a data rate (data rates) under a group of parameters, and the group of parameters may include a quantity of spatial streams, a modulation scheme, and a code rate.

In this embodiment, each MCS index corresponds to one piece of spectrum effectiveness, different MCS indexes correspond to different pieces of spectrum effectiveness, and the terminal device finds the spectrum effectiveness based on the MCS indexes that are used for sending the data packet. Table 1 is a schematic diagram of a correspondence between the MCS indexes and the spectrum effectiveness, and Table 1 is as follows:

TABLE 1

| MCS index (index) | Modulation order (modulation order) | Target code rate (target code rate) | Spectrum effectiveness (spectrum effectiveness) |
|---|---|---|---|
| 0 | XX | XX | 0.2344 |
| 1 | XX | XX | 0.3066 |
| 2 | XX | XX | 0.3770 |
| 3 | XX | XX | 0.4902 |
| 4 | XX | XX | 0.6016 |
| 5 | XX | XX | 0.7402 |
| 6 | XX | XX | 0.8770 |
| 7 | XX | XX | 1.0273 |
| 8 | XX | XX | 1.1758 |
| 9 | XX | XX | 1.3262 |
| 10 | XX | XX | 1.3281 |
| 11 | XX | XX | 1.4766 |
| 12 | XX | XX | 1.6953 |

After obtaining spectrum effectiveness corresponding to detection packets that are sent within the uplink estimated time, the terminal device calculates an average value of the spectrum effectiveness corresponding to all the detection packets that are sent through the antennas within the uplink estimated time, to obtain spectrum effectiveness of the antennas within the uplink estimated time. When spectrum effectiveness of each antenna is calculated, only spectrum effectiveness corresponding to a detection packet that is sent through the antenna is used.

For example, 10 detection packets are sent through each of the antenna 1, the antenna 2, and the antenna 3 within the uplink estimated time. When spectrum effectiveness of the antenna 1 is calculated, an average value is calculated for spectrum effectiveness corresponding to the 10 detection packets that are sent through the antenna 1, to obtain the spectrum effectiveness of the antenna 1.

Optionally, the terminal device may perform alpha mean filtering on the spectrum effectiveness corresponding to the detection packets that are sent through the antennas within the uplink estimated time, to obtain the spectrum effectiveness of the antennas within the uplink estimated time.

The foregoing description is merely an example, and the spectrum effectiveness of a main antenna and a diversity antenna may also be calculated in another manner.

S103: Switch a current transmit antenna of the terminal device based on the spectrum effectiveness of the at least two antennas.

For example, the current transmit antenna is switched in the following manners:

Manner 1: Calculate a first difference between spectrum effectiveness of the current transmit antenna and spectrum effectiveness of an antenna with highest spectrum effectiveness in the at least two antennas; and when an absolute value of the first difference is greater than or equal to a preset spectrum effectiveness threshold, and the antenna with the highest spectrum effectiveness is different from the current transmit antenna, switch the current transmit antenna to the antenna with the highest spectrum effectiveness.

In this manner, the antenna with the highest spectrum effectiveness is determined from the at least two antennas, the first difference between the spectrum effectiveness of the antenna with the highest spectrum effectiveness and the spectrum effectiveness of the current transmit antenna is calculated, and whether the absolute value of the first difference is greater than or equal to the spectrum effectiveness threshold is determined. When the absolute value of the first difference is greater than or equal to the spectrum effectiveness threshold, the current transmit antenna is switched to the antenna with the highest spectrum effectiveness.

That the absolute value of the first difference is greater than or equal to the preset spectrum effectiveness threshold indicates that uplink transmit performance of the antenna with the highest spectrum effectiveness is better than uplink transmit performance of the current transmit antenna. Therefore, the current transmit antenna is switched to the antenna with the highest spectrum effectiveness to improve performance of an uplink transmit antenna.

When the absolute value of the first difference is less than the spectrum effectiveness threshold, or the absolute value of the first difference is greater than or equal to the spectrum effectiveness threshold, but the antenna with the highest spectrum effectiveness is the same as the current transmit antenna, the current transmit antenna is not switched.

The antenna with the highest spectrum effectiveness may be the current transmit antenna. When the antenna with the highest spectrum effectiveness is the current transmit antenna, the first difference is equal to 0, and the absolute value of the first difference is less than the spectrum effectiveness threshold.

That the absolute value of the first difference is less than the spectrum effectiveness threshold indicates that the uplink transmit performance of the antenna with the highest spectrum effectiveness is the same or nearly the same as the uplink transmit performance of the current transmit antenna. In this case, even if the current transmit antenna is switched to the antenna with the highest spectrum effectiveness, performance of uplink transmission is improved insignificantly, and the transmit antenna switching also consumes some resources. Therefore, in this embodiment, when the absolute value of the first difference between the spectrum effectiveness of the antenna with the highest spectrum effectiveness and the spectrum effectiveness of the current transmit antenna is less than the spectrum effectiveness threshold, the current transmit antenna is not switched.

Manner 2: Determine an antenna with highest spectrum effectiveness from the at least two antennas; and when the antenna with the highest spectrum effectiveness is different from the current transmit antenna, switch the current transmit antenna to the antenna with the highest spectrum effectiveness.

Manner 3: Calculate a first difference between spectrum effectiveness of an antenna with highest spectrum effectiveness in the at least two antennas and spectrum effectiveness of an antenna with lowest spectrum effectiveness in the at least two antennas; and when an absolute value of the first difference is greater than or equal to a preset spectrum effectiveness threshold, and the antenna with the highest spectrum effectiveness is different from the current transmit antenna, switch the current transmit antenna to the antenna with the highest spectrum effectiveness.

In this manner, the antenna with the highest spectrum effectiveness and the antenna with the lowest spectrum effectiveness are determined from the at least two antennas, the first difference between the spectrum effectiveness of the antenna with the highest spectrum effectiveness and the spectrum effectiveness of the antenna with the lowest spectrum effectiveness is calculated, and whether the absolute value of the first difference is greater than or equal to the spectrum effectiveness threshold is determined. When the absolute value of the first difference is greater than or equal to the spectrum effectiveness threshold, whether the antenna with the highest spectrum effectiveness is the same as the current transmit antenna is determined. When the antenna with the highest spectrum effectiveness is different from the current transmit antenna, the current transmit antenna is switched to the antenna with the highest spectrum effectiveness.

That the absolute value of the first difference is greater than or equal to the preset spectrum effectiveness threshold indicates that uplink transmit performance of the antenna with the highest spectrum effectiveness is better than uplink transmit performance of a transmit antenna with the lowest spectrum effectiveness, and uplink transmit performance of antennas differs greatly. Therefore, the current transmit antenna needs to be switched to improve the performance of the uplink transmit antenna.

When the absolute value of the first difference is less than the spectrum effectiveness threshold, or the absolute value of the first difference is greater than or equal to the spectrum effectiveness threshold, but the antenna with the highest spectrum effectiveness is the same as the current transmit antenna, the current transmit antenna is not switched.

That the absolute value of the first difference is less than the spectrum effectiveness threshold indicates that there is no significant difference between the uplink transmit performance of the antenna with the highest spectrum effectiveness and the uplink transmit performance of the antenna with the lowest spectrum effectiveness. Therefore, uplink transmit performance of the antennas is basically the same. In this case, even if the current transmit antenna is switched to the antenna with the highest spectrum effectiveness, performance of uplink transmission is improved insignificantly. Therefore, the current transmit antenna is not switched.

Manner 4: Calculate a first difference between spectrum effectiveness of any two of the at least two antennas; and when an absolute value of the first difference between the spectrum effectiveness of any two antennas is greater than or equal to a preset spectrum effectiveness threshold, and when the antenna with highest spectrum effectiveness in the at least two antennas are different from the current transmit antenna, switch the current transmit antenna to the antenna with the highest spectrum effectiveness.

In this manner, the first difference between the spectrum effectiveness of any two antennas needs to be calculated. For example, if there are three antennas in total, a first difference between spectrum effectiveness of an antenna 1 and an antenna 2, a first difference between spectrum effectiveness of the antenna 2 and an antenna 3, and a first difference between the spectrum effectiveness of the antenna 1 and the antenna 3 need to be calculated. Then, whether absolute values of the plurality of first differences each are greater than or equal to the spectrum effectiveness threshold is sequentially determined. If an absolute value of one of the plurality of first differences is greater than or equal to the preset spectrum effectiveness threshold, whether the antenna with highest spectrum effectiveness in the at least two antennas is the same as the current transmit antenna is further determined. If the antenna with the highest spectrum effectiveness is different from the current transmit antenna, the current transmit antenna is switched to the antenna with the highest spectrum effectiveness.

That the absolute value of the first difference between the spectrum effectiveness of any two antennas is greater than or equal to the preset spectrum effectiveness threshold indicates that uplink transmit performance of antennas differs greatly, and the current transmit antenna needs to be switched to improve performance of an uplink transmit antenna.

When the absolute values of all the first differences are less than the spectrum effectiveness threshold, or the absolute values of all the first differences are greater than or equal to the spectrum effectiveness threshold, but the antenna with the highest spectrum effectiveness is the same as the current transmit antenna, the current transmit antenna is not switched.

That the absolute values of all the first differences are less than the spectrum effectiveness threshold indicates that there is no significant difference between the uplink transmit performance of the antennas, and the current transmit antenna is not switched.

Manner 5: On the basis of Manner 1 to Manner 4, before the switching a current transmit antenna of the terminal device based on spectrum effectiveness of the at least two antennas, the method further includes the following steps: detecting downlink received energy that is of the at least two antennas and that is within downlink estimated time; determining whether an absolute value of a second difference is greater than or equal to a preset energy threshold, where the second difference is a difference between downlink received energy of an antenna with highest downlink received energy in the at least two antennas and downlink received energy of an antenna with lowest downlink received energy in the at least two antennas; and when the absolute value of the second difference is greater than or equal to the preset energy threshold, switching the current transmit antenna based on the spectrum effectiveness of the at least two antennas.

The uplink estimated time and the downlink estimated time may be the same or different. This is not limited in this embodiment.

In this embodiment, downlink received energy of each antenna may be obtained by detecting a reference signal received power (Reference Signal Receiving Power, RSRP) of the antenna, and the terminal device may perform smooth filtering on the RSRP of the antenna within downlink detection time to obtain the downlink received energy of the antenna. It may be understood that the downlink received energy of the antenna may also be obtained through measurement in another manner, and this is not limited in this embodiment.

In this manner, the terminal device determines, with reference to uplink quality and downlink quality of the at least two antennas, whether to switch the current transmit antenna, so that the switching is more accurate.

Manner 6: Before the switching a current transmit antenna of the terminal device based on spectrum effectiveness of the at least two antennas, the method further includes the following steps: detecting downlink received energy that is of the at least two antennas and that is within downlink estimated time; determining whether an absolute value of a second difference is greater than or equal to a preset energy threshold, where the second difference is a difference between downlink received energy of an antenna with highest downlink received energy in the at least two antennas and downlink received energy of an antenna with lowest downlink received energy in the at least two antennas; when the absolute value of the second difference is greater than or equal to the preset energy threshold, determining whether spectrum effectiveness of the current transmit antenna is less than a preset switching threshold; and when the spectrum effectiveness of the current transmit antenna is less than the switching threshold, switching the current transmit antenna to the antenna with highest spectrum effectiveness in the at least two antennas.

In this manner, the terminal device determines, with reference to uplink quality and downlink quality of the at least two antennas, whether to switch the current transmit antenna, so that the switching is more accurate.

In this embodiment, when the current transmit antenna is switched, the current transmit antenna is first turned off, and then is switched.

In this embodiment, the terminal device sends the detection packets within the uplink estimated time through the at least two antennas, obtains, based on the response messages corresponding to the detection packets, the spectrum effectiveness that is of the at least two antennas and that is within the uplink estimated time, and switches a current transmit antenna of the terminal device based on the spectrum effectiveness of the at least two antennas. In this manner, the terminal device determines, based on the uplink spectrum effectiveness of the at least two antennas, whether to switch the current transmit antenna. Because the uplink spectrum effectiveness of the antennas can accurately reflect a real environment of uplink transmission, antenna switching can be accurately performed. This improves performance of an uplink transmit antenna.

Figure 4:
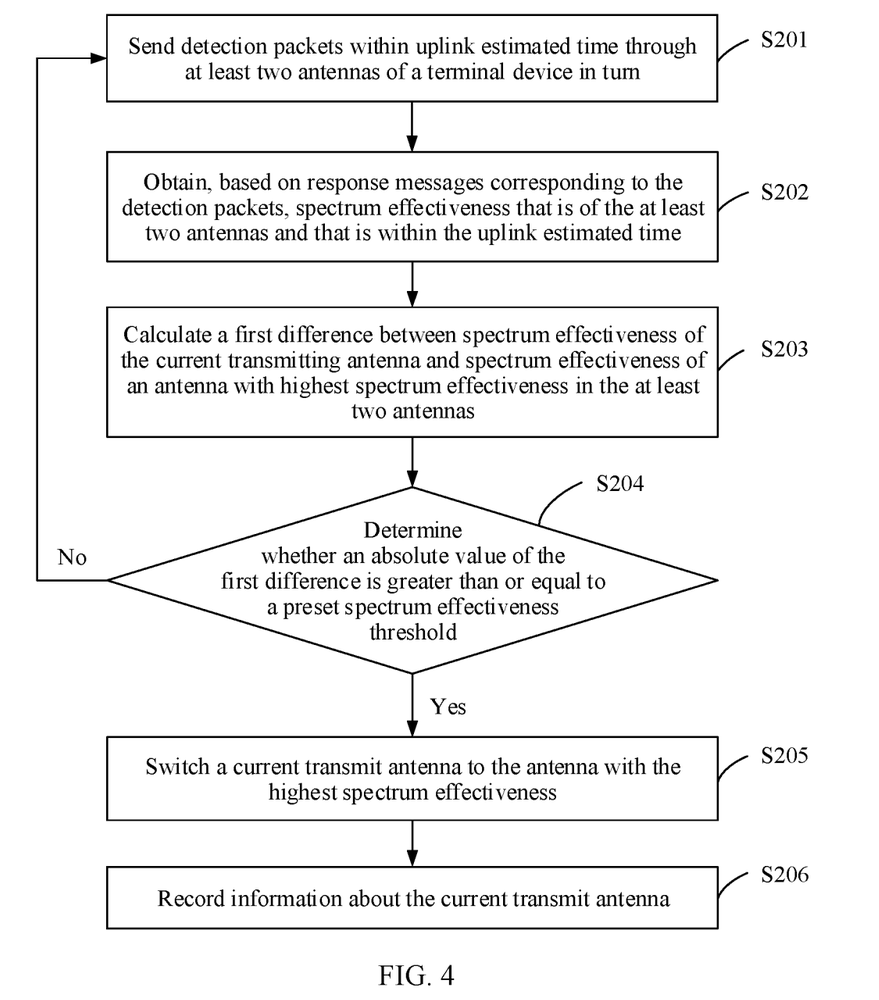
FIG. 4 is a flowchart of an antenna switching method for a terminal device according to Embodiment 2 of this application.

FIG. 4 is a flowchart of an antenna switching method for a terminal device according to Embodiment 2 of this application. As shown in FIG. 4, the method provided in this embodiment includes the following steps:

S201: Send detection packets within uplink estimated time through at least two antennas of the terminal device in turn.

S202: Obtain, based on response messages corresponding to the detection packets, spectrum effectiveness that is of the at least two antennas and that is within the uplink estimated time.

For steps S201 and S202, refer to related descriptions in Embodiment 1. Details are not described herein again.

S203: Calculate a first difference between spectrum effectiveness of the current transmit antenna and spectrum effectiveness of an antenna with highest spectrum effectiveness in the at least two antennas.

S204: Determine whether an absolute value of the first difference is greater than or equal to a preset spectrum effectiveness threshold.

When the absolute value of the first difference is greater than or equal to the preset spectrum effectiveness threshold, step S205 is performed; or when the absolute value of the first difference is greater than or equal to the preset spectrum effectiveness threshold, step S201 is performed.

S205: Switch the current transmit antenna to the antenna with the highest spectrum effectiveness.

S206: Record information about the current transmit antenna.

Figure 5:
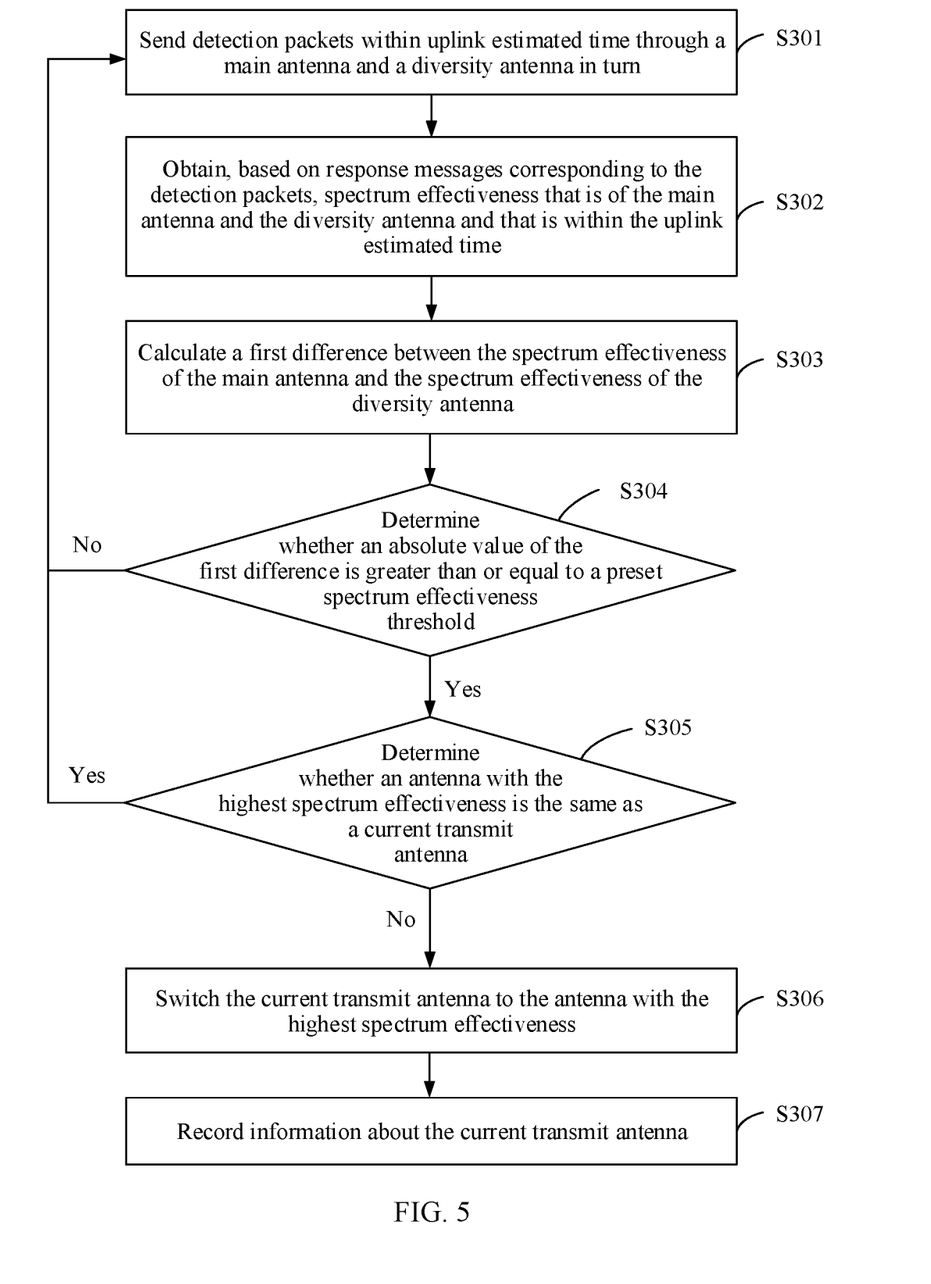
FIG. 5 is a flowchart of an antenna switching method for a terminal device according to Embodiment 3 of this application.

FIG. 5 is a flowchart of an antenna switching method for a terminal device according to Embodiment 3 of this application. An example in which the terminal device includes a main antenna and a diversity antenna is used for description in this embodiment. As shown in FIG. 5, the method provided in this embodiment includes the following steps:

S301: Send detection packets within uplink estimated time through the main antenna and the diversity antenna in turn.

S302: Obtain, based on response messages corresponding to the detection packets, spectrum effectiveness that is of the main antenna and the diversity antenna and that is within the uplink estimated time.

S303: Calculate a first difference between the spectrum effectiveness of the main antenna and the spectrum effectiveness of the diversity antenna.

S304: Determine whether an absolute value of the first difference is greater than or equal to a preset spectrum effectiveness threshold.

When the absolute value of the first difference is greater than or equal to the spectrum effectiveness threshold, step S305 is performed; or when the absolute value of the first difference is less than the spectrum effectiveness threshold, step S301 is performed.

S305: Determine whether an antenna with highest spectrum effectiveness is the same as the current transmit antenna.

The antenna with the highest spectrum effectiveness is the main antenna or the diversity antenna. When the antenna with the highest spectrum effectiveness is different from the current transmit antenna, step S306 is performed; or when the antenna with the highest spectrum effectiveness is the same as the current transmit antenna, step S307 is performed.

S306: Switch the current transmit antenna to the antenna with the highest spectrum effectiveness.

After step 306, step S307 is performed.

S307: Record information about the current transmit antenna.

For example, an identifier of the current transmit antenna is recorded, that is, whether the current transmit antenna is the main antenna or the diversity antenna is recorded, and antenna switching time may be recorded.

Figure 6:
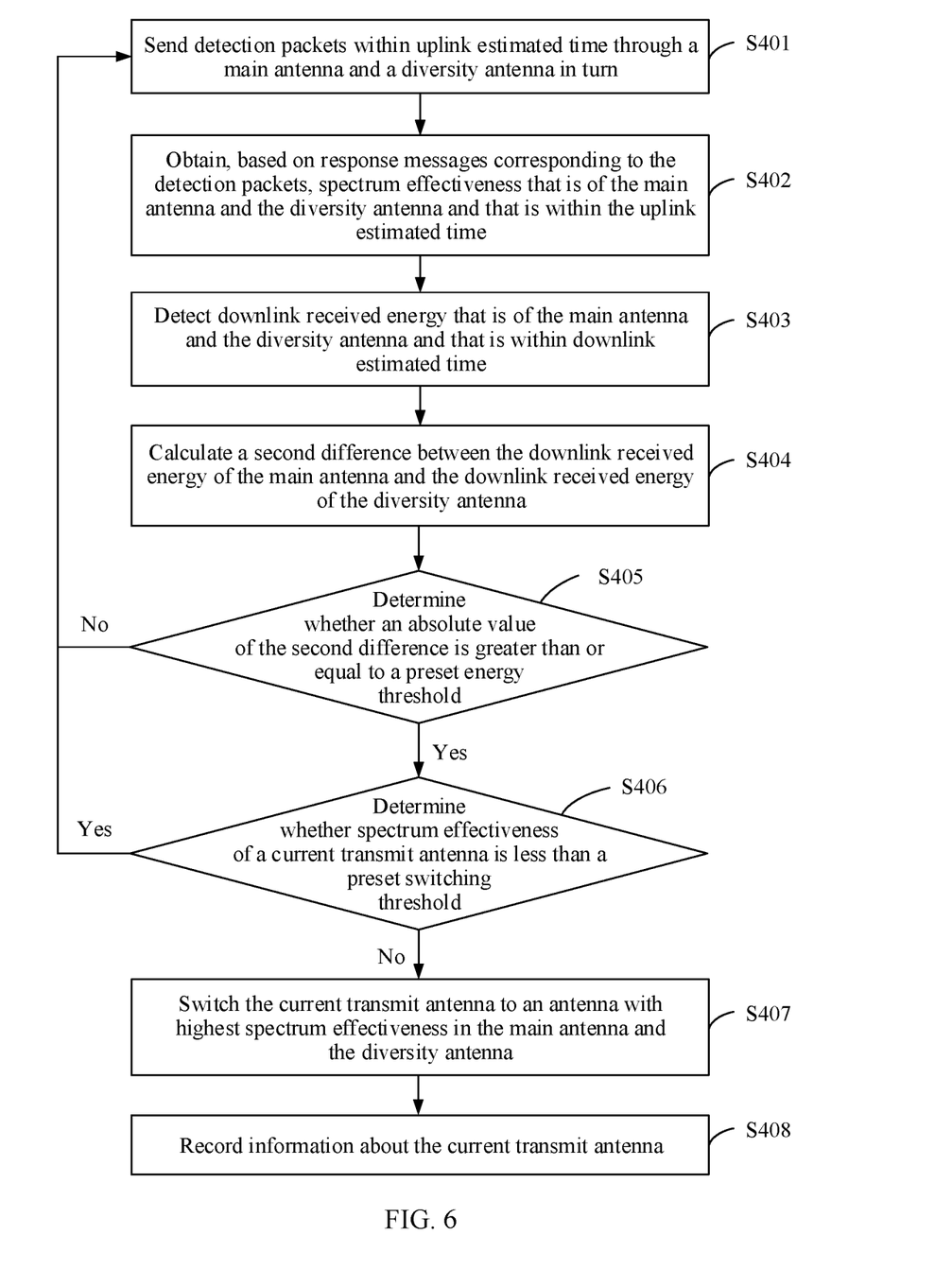
FIG. 6 is a flowchart of an antenna switching method for a terminal device according to Embodiment 4 of this application.

FIG. 6 is a flowchart of an antenna switching method for a terminal device according to Embodiment 4 of this application. An example in which the terminal device includes a main antenna and a diversity antenna is used for description in this embodiment. As shown in FIG. 6, the method provided in this embodiment includes the following steps:

S401: Send detection packets within uplink estimated time through the main antenna and the diversity antenna in turn.

S402: Obtain, based on response messages corresponding to the detection packets, spectrum effectiveness that is of the main antenna and the diversity antenna and that is within the uplink estimated time.

S403: Detect downlink received energy that is of the main antenna and the diversity antenna and that is within downlink estimated time.

It should be noted that step S401 and step S403 are performed in no sequence, and may also be performed at the same time.

S404: Calculate a second difference between the downlink received energy of the main antenna and the downlink received energy of the diversity antenna.

S405: Determine whether an absolute value of the second difference is greater than or equal to a preset energy threshold.

When the absolute value of the second difference is greater than or equal to the preset energy threshold, step S408 is performed; or when the absolute value of the second difference is less than the preset energy threshold, step S401 is performed.

S406: Determine whether spectrum effectiveness of the current transmit antenna is less than a preset switching threshold.

The current transmit antenna is the main antenna or the diversity antenna. When the spectrum effectiveness of the current transmit antenna is less than the preset switching threshold, step S407 is performed; or when the spectrum effectiveness of the current transmit antenna is not less than (namely, greater than or equal to) the preset switching threshold, S401 is performed.

S407: Switch the current transmit antenna to an antenna with highest spectrum effectiveness in the main antenna and the diversity antenna.

If the current transmit antenna is the main antenna, the current transmit antenna is switched to the diversity antenna; or if the current transmit antenna is the diversity antenna, the current transmit antenna is switched to the main antenna.

S408: Record information about the current transmit antenna.

When uplink pre-scheduling is insufficient, it takes a long time to detect the spectrum effectiveness of the main antenna and the diversity antenna. In this embodiment, determining is first performed based on the downlink received energy of the main antenna and the diversity antenna. When a difference between the downlink received energy of the main antenna and the diversity antenna meets the condition, switching can be performed only by evaluating the spectrum effectiveness of the current transmit antenna, to reduce switching time.

Figure 7:
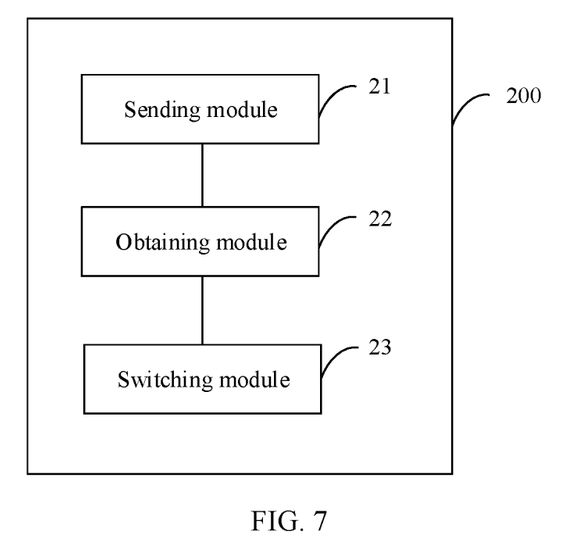
FIG. 7 is a schematic structural diagram of a terminal device according to Embodiment 5 of this application.

FIG. 7 is a schematic structural diagram of a terminal device according to Embodiment 5 of this application. As shown in FIG. 7, a terminal device 200 provided in this embodiment includes:

a sending module 21, configured to send detection packets within uplink estimated time through at least two antennas of the terminal device;

an obtaining module 22, configured to obtain, based on response messages corresponding to the detection packets, spectrum effectiveness that is of the at least two antennas and that is within the uplink estimated time; and a switching module 23, configured to switch a current transmit antenna of the terminal device based on the spectrum effectiveness of the at least two antennas.

Optionally, the switching module 23 is specifically configured to:

calculate a first difference between spectrum effectiveness of the current transmit antenna and spectrum effectiveness of an antenna with highest spectrum effectiveness in the at least two antennas; and when an absolute value of the first difference is greater than or equal to a preset spectrum effectiveness threshold, switch the current transmit antenna to the antenna with the highest spectrum effectiveness.

Optionally, the switching module 23 is specifically configured to:

determine an antenna with highest spectrum effectiveness from the at least two antennas; and when the antenna with the highest spectrum effectiveness is different from the current transmit antenna, switch the current transmit antenna to the antenna with the highest spectrum effectiveness.

Optionally, the switching module 23 is specifically configured to:

calculate a first difference between spectrum effectiveness of an antenna with highest spectrum effectiveness in the at least two antennas and spectrum effectiveness of an antenna with lowest spectrum effectiveness in the at least two antennas; and when an absolute value of the first difference is greater than or equal to a preset spectrum effectiveness threshold, and the antenna with the highest spectrum effectiveness is different from the current transmit antenna, switch the current transmit antenna to the antenna with the highest spectrum effectiveness.

Optionally, the switching module 23 is specifically configured to:

calculate a first difference between spectrum effectiveness of any two of the at least two antennas; and when an absolute value of the first difference between the spectrum effectiveness of any two antennas is greater than or equal to a preset spectrum effectiveness threshold, and an antenna with highest spectrum effectiveness in the at least two antennas is different from the current transmit antenna, switch the current transmit antenna to the antenna with the highest spectrum effectiveness.

Optionally, the terminal device 200 further includes a detection module and a determining module.

The detection module is configured to detect downlink received energy that is of the at least two antennas and that is within downlink estimated time; and a determining module, configured to determine whether an absolute value of a second difference is greater than or equal to a preset energy threshold, where the second difference is a difference between downlink received energy of an antenna with highest downlink received energy in the at least two antennas and downlink received energy of an antenna with lowest downlink received energy in the at least two antennas.

Correspondingly, the switching module 23 is specifically configured to:

when the absolute value of the second difference is greater than or equal to the preset energy threshold, switch the current transmit antenna based on the spectrum effectiveness of the at least two antennas.

Optionally, the terminal device 200 further includes a detection module and a determining module.

The detection module is configured to detect downlink received energy that is of the at least two antennas and that is within downlink estimated time; and a determining module, configured to determine whether an absolute value of a second difference is greater than or equal to a preset energy threshold, where the second difference is a difference between downlink received energy of an antenna with highest downlink received energy in the at least two antennas and downlink received energy of an antenna with lowest downlink received energy in the at least two antennas.

Correspondingly, the switching module 23 is specifically configured to:

when the absolute value of the second difference is greater than or equal to the preset energy threshold, determine whether spectrum effectiveness of the current transmit antenna is less than a preset switching threshold; and when the spectrum effectiveness of the current transmit antenna is less than the switching threshold, switch the current transmit antenna to an antenna with highest spectrum effectiveness in the at least two antennas.

Optionally, the detection packets are empty packets, and the empty packets do not carry user data. The terminal device 200 further includes a receiving module.

The receiving module is configured to receive an uplink grant message sent by a base station, where the uplink grant message is sent by the base station according to pre-scheduling time.

The sending module 21 is specifically configured to:
send the detection packets based on the uplink grant message within the uplink estimated time through the at least two antennas in turn.

Optionally, the detection packets are empty packets, and the empty packets do not carry user data. The terminal device 200 further includes a receiving module.

The sending module 21 is further configured to send a scheduling request SR to a base station.

The receiving module is configured to receive an uplink grant message sent by the base station.

The switching module 23 is specifically configured to:
send the detection packets based on the uplink grant message within the uplink estimated time through the at least two antennas in turn.

Optionally, the at least two antennas include a main antenna and a diversity antenna. The main antenna is disposed at the bottom of the terminal device, and the diversity antenna is disposed at the top of the terminal device.

The terminal device provided in this embodiment may be configured to perform the methods performed by the terminal device in Embodiment 1 to Embodiment 4. Specific implementations and technical effects are similar, and details are not described herein again.

Figure 8:
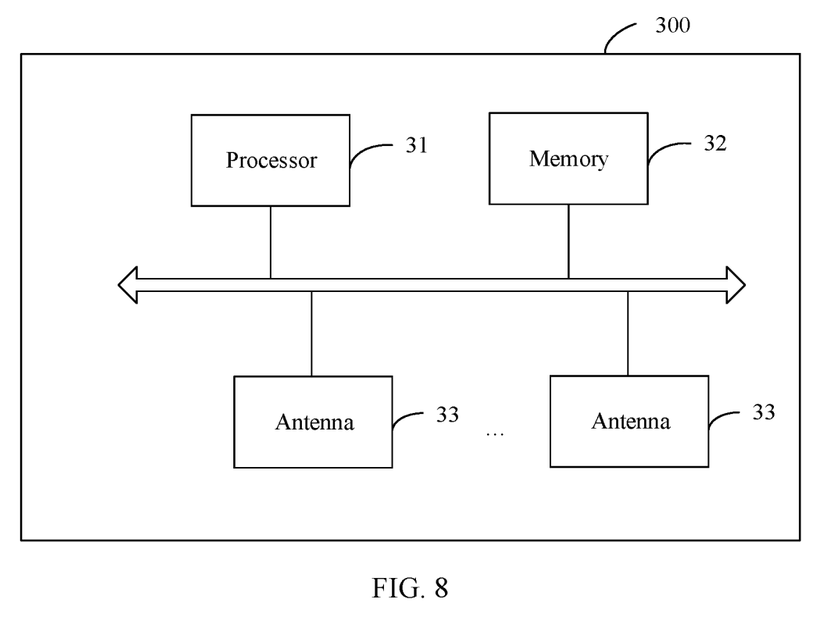
FIG. 8 is a schematic structural diagram of a terminal device according to Embodiment 6 of this application.

FIG. 8 is a schematic structural diagram of a terminal device according to Embodiment 6 of this application. As shown in FIG. 8, the terminal device 300 includes a processor 31, a memory 32, and at least two antennas 33. The memory 32 is configured to store instructions, and the antenna 33 is configured to communicate with another device. The processor 31 is configured to execute the instructions stored in the memory 32, so that the terminal device 300 is enabled to perform the methods performed by the terminal device in Embodiment 1 to Embodiment 4. Specific implementations and technical effects are similar, and details are not described herein again.

An embodiment of this application further provides a computer-readable storage medium. The computer-readable storage medium stores instructions. When the instructions are executed, a computer is enabled to perform the methods performed by the terminal device in the foregoing Embodiment 1 to Embodiment 4. Specific implementations and technical effects are similar. Details are not described herein again.

It may be understood that the processor used by the terminal device in the embodiments of this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may alternatively be a combination implementing a computing function, for example, a combination of one or more microprocessors or a combination of a DSP and a microprocessor.

The bus in the embodiments of this application may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

In the several embodiments provided in this application, it should be understood that the disclosed apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for enabling a computer device (which may be a personal computer, a server, or a network device) or a processor to perform some steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. An antenna switching method for a terminal device, comprising:
sending detection packets within an uplink estimated time through at least two antennas of the terminal device, wherein the detection packets do not carry user data;
obtaining, based on response messages corresponding to the detection packets, a spectrum effectiveness of the at least two antennas and that is within the uplink estimated time; and
switching a current transmit antenna of the terminal device based on the spectrum effectiveness of the at least two antennas.

2. The method according to claim 1, wherein the switching a current transmit antenna of the terminal device based on the spectrum effectiveness of the at least two antennas comprises:
calculating a first difference between a spectrum effectiveness of the current transmit antenna and a spectrum effectiveness of an antenna with highest spectrum effectiveness in the at least two antennas; and
when an absolute value of the first difference is greater than or equal to a preset spectrum effectiveness threshold, switching the current transmit antenna to an antenna with a highest spectrum effectiveness.

3. The method according to claim 1, wherein the switching a current transmit antenna of the terminal device based on the spectrum effectiveness of the at least two antennas comprises:
  determining an antenna with a highest spectrum effectiveness from the at least two antennas; and
  when the antenna with the highest spectrum effectiveness is different from the current transmit antenna, switching the current transmit antenna to the antenna with the highest spectrum effectiveness.

4. The method according to claim 1, wherein the switching a current transmit antenna of the terminal device based on the spectrum effectiveness of the at least two antennas comprises:
  calculating a first difference between a spectrum effectiveness of an antenna with a highest spectrum effectiveness in the at least two antennas and a spectrum effectiveness of an antenna with a lowest spectrum effectiveness in the at least two antennas; and
  when an absolute value of the first difference is greater than or equal to a preset spectrum effectiveness threshold, and the antenna with the highest spectrum effectiveness is different from the current transmit antenna, switching the current transmit antenna to the antenna with the highest spectrum effectiveness.

5. The method according to claim 1, wherein the switching a current transmit antenna of the terminal device based on the spectrum effectiveness of the at least two antennas comprises:
  calculating a first difference between a spectrum effectiveness of any two of the at least two antennas; and
  when an absolute value of the first difference between the a spectrum effectiveness of any two antennas is greater than or equal to a preset spectrum effectiveness threshold, and an antenna with a highest spectrum effectiveness in the at least two antennas is different from the current transmit antenna, switching the current transmit antenna to the antenna with the highest spectrum effectiveness.

6. The method according to claim 1, wherein before the switching a current transmit antenna based on the spectrum effectiveness of the at least two antennas, the method further comprises:
  detecting downlink received energy of the at least two antennas and that is within a downlink estimated time;
  determining whether an absolute value of a second difference is greater than or equal to a preset energy threshold, wherein the second difference is a difference between a downlink received energy of an antenna with a highest downlink received energy in the at least two antennas and a downlink received energy of an antenna with a lowest downlink received energy in the at least two antennas; and
  the switching a current transmit antenna based on the spectrum effectiveness of the at least two antennas comprises:
  when the absolute value of the second difference is greater than or equal to the preset energy threshold, switching the current transmit antenna based on the spectrum effectiveness of the at least two antennas.

7. The method according to claim 1, wherein before the switching a current transmit antenna based on the spectrum effectiveness of the at least two antennas, the method further comprises:
  detecting a downlink received energy of the at least two antennas and that is within a downlink estimated time;
  determining whether an absolute value of a second difference is greater than or equal to a preset energy threshold, wherein the second difference is a difference between a downlink received energy of an antenna with a highest downlink received energy in the at least two antennas and a downlink received energy of an antenna with a lowest downlink received energy in the at least two antennas; and
  the switching a current transmit antenna based on the spectrum effectiveness of the at least two antennas comprises:
  when the absolute value of the second difference is greater than or equal to the preset energy threshold, determining whether a spectrum effectiveness of the current transmit antenna is less than a preset switching threshold; and
  when the spectrum effectiveness of the current transmit antenna is less than the switching threshold, switching the current transmit antenna to an antenna with a highest spectrum effectiveness in the at least two antennas.

8. The method according to claim 1, wherein before the sending detection packets within the uplink estimated time through at least two antennas of the terminal device, the method further comprises:
  receiving an uplink grant message sent by a base station, wherein the uplink grant message is sent by the base station according to a pre-scheduling time; and
  the sending detection packets within the uplink estimated time through at least two antennas of the terminal device comprises:
  sending the detection packets based on the uplink grant message within the uplink estimated time through the at least two antennas in turn.

9. The method according to claim 1, wherein before the sending detection packets within the uplink estimated time through at least two antennas of the terminal device, the method further comprises:
  sending a scheduling request (SR) to a base station; and
  receiving an uplink grant message sent by the base station; and
  the sending detection packets within the uplink estimated time through at least two antennas of the terminal device comprises:
  sending the detection packets based on the uplink grant message within the uplink estimated time through the at least two antennas in turn.

10. The method according to claim 1, wherein the at least two antennas comprise a main antenna and a diversity antenna, the main antenna is disposed at a bottom of the terminal device, and the diversity antenna is disposed at a top of the terminal device.

11. A terminal device, comprising at least two antennas, a processor, and a memory, wherein the memory is configured to store instructions, the at least two antennas are configured to communicate with another device, and the processor is configured to execute the instructions stored in the memory, so that the terminal device performs:
  sending detection packets within an uplink estimated time through the at least two antennas, wherein the detection packets do not carry user data;
  obtaining, based on response messages corresponding to the detection packets, a spectrum effectiveness of the at least two antennas and that is within the uplink estimated time; and switching a current transmit antenna of the terminal device based on the spectrum effectiveness of the at least two antennas.

12. The terminal device of claim 11, wherein the processor is configured to execute the instructions stored in the memory, so that the terminal device further performs:
calculating a first difference between a spectrum effectiveness of the current transmit antenna and a spectrum effectiveness of an antenna with a highest spectrum effectiveness in the at least two antennas; and
when an absolute value of the first difference is greater than or equal to a preset spectrum effectiveness threshold, switching the current transmit antenna to the antenna with the highest spectrum effectiveness.

13. The terminal device of claim 11, wherein the processor is configured to execute the instructions stored in the memory, so that the terminal device further performs:
determining an antenna with a highest spectrum effectiveness from the at least two antennas; and
when the antenna with the highest spectrum effectiveness is different from the current transmit antenna, switching the current transmit antenna to the antenna with the highest spectrum effectiveness.

14. The terminal device of claim 11, wherein the processor is configured to execute the instructions stored in the memory, so that the terminal device further performs:
calculating a first difference between a spectrum effectiveness of an antenna with a highest spectrum effectiveness in the at least two antennas and a spectrum effectiveness of an antenna with a lowest spectrum effectiveness in the at least two antennas; and
when an absolute value of the first difference is greater than or equal to a preset spectrum effectiveness threshold, and the antenna with the highest spectrum effectiveness is different from the current transmit antenna, switching the current transmit antenna to the antenna with the highest spectrum effectiveness.

15. The terminal device of claim 11, wherein the processor is configured to execute the instructions stored in the memory, so that the terminal device further performs:
calculating a first difference between a spectrum effectiveness of any two of the at least two antennas; and
when an absolute value of the first difference between the spectrum effectiveness of any two antennas is greater than or equal to a preset spectrum effectiveness threshold, and an antenna with highest spectrum effectiveness in the at least two antennas is different from the current transmit antenna, switching the current transmit antenna to the antenna with the highest spectrum effectiveness.

16. The terminal device of claim 11, wherein the processor is configured to execute the instructions stored in the memory, so that the terminal device further performs:
detecting a downlink received energy of the at least two antennas and that is within a downlink estimated time;
determining whether an absolute value of a second difference is greater than or equal to a preset energy threshold, wherein the second difference is a difference between a downlink received energy of an antenna with a highest downlink received energy in the at least two antennas and a downlink received energy of an antenna with a lowest downlink received energy in the at least two antennas; and
when the absolute value of the second difference is greater than or equal to the preset energy threshold, switching the current transmit antenna based on the spectrum effectiveness of the at least two antennas.

17. The terminal device of claim 11, wherein the processor is configured to execute the instructions stored in the memory, so that the terminal device further performs:
detecting a downlink received energy of the at least two antennas and that is within downlink estimated time;
determining whether an absolute value of a second difference is greater than or equal to a preset energy threshold, wherein the second difference is a difference between a downlink received energy of an antenna with a highest downlink received energy in the at least two antennas and a downlink received energy of an antenna with a lowest downlink received energy in the at least two antennas; and
when the absolute value of the second difference is greater than or equal to the preset energy threshold, determining whether a spectrum effectiveness of the current transmit antenna is less than a preset switching threshold; and
when the spectrum effectiveness of the current transmit antenna is less than the switching threshold, switching the current transmit antenna to an antenna with highest spectrum effectiveness in the at least two antennas.

18. The terminal device of claim 11, wherein the processor is configured to execute the instructions stored in the memory, so that the terminal device further performs
receiving an uplink grant message sent by a base station, wherein the uplink grant message is sent by the base station according to a pre-scheduling time; and
sending the detection packets based on the uplink grant message within the uplink estimated time through the at least two antennas in turn.

19. A non-transitory computer-readable storage medium, wherein the computer-readable storage medium stores instructions, and when the instructions are executed, a computer is enabled to perform:
sending detection packets within an uplink estimated time through at least two antennas, wherein the detection packets do not carry user data;
obtaining, based on response messages corresponding to the detection packets, a spectrum effectiveness of the at least two antennas and that is within the uplink estimated time; and
switching a current transmit antenna of the terminal device based on the spectrum effectiveness of the at least two antennas.

* * * * *